(12) United States Patent
Minematsu

(10) Patent No.: US 10,355,862 B2
(45) Date of Patent: Jul. 16, 2019

(54) MAC TAG LIST GENERATING APPARATUS, MAC TAG LIST VERIFYING APPARATUS, MAC TAG LIST GENERATING METHOD, MAC TAG LIST VERIFYING METHOD AND PROGRAM RECORDING MEDIUM

(71) Applicant: NEC CORPORATION, Tokyo (JP)

(72) Inventor: Kazuhiko Minematsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 112 days.

(21) Appl. No.: 15/521,097

(22) PCT Filed: Oct. 16, 2015

(86) PCT No.: PCT/JP2015/005247
§ 371 (c)(1),
(2) Date: Apr. 21, 2017

(87) PCT Pub. No.: WO2016/063512
PCT Pub. Date: Apr. 28, 2016

(65) Prior Publication Data
US 2018/0013550 A1 Jan. 11, 2018

(30) Foreign Application Priority Data
Oct. 23, 2014 (JP) ................................. 2014-216361

(51) Int. Cl.
*H04L 9/08* (2006.01)
*G09C 1/00* (2006.01)
(Continued)

(52) U.S. Cl.
CPC ............... *H04L 9/088* (2013.01); *G09C 1/00* (2013.01); *H04L 9/0643* (2013.01); *H04L 9/32* (2013.01)

(58) Field of Classification Search
CPC ....................................................... H04L 9/088
(Continued)

(56) References Cited

U.S. PATENT DOCUMENTS

| 2013/0238900 A1* | 9/2013 | Leggette | H04L 63/0428 |
| | | | 713/165 |
| 2014/0289526 A1* | 9/2014 | Nagai | H04L 9/0819 |
| | | | 713/171 |
| 2015/0304293 A1* | 10/2015 | Okamura | G09C 1/00 |
| | | | 726/6 |

OTHER PUBLICATIONS

Morris Dworkin, "Recommendation for Block Cipher Modes of Operation: The CMAC Mode for Authentication", NIST Special Publication 800-38B, May 2005.
(Continued)

*Primary Examiner* — Khalil Naghdali
(74) *Attorney, Agent, or Firm* — Sughrue Mion, PLLC

(57) ABSTRACT

Disclosed is a MAC tag list generating apparatus capable of efficiently performing message authentication through which information pertaining to a falsified position as well as existence of falsification can be obtained. This MAC tag list generating apparatus is provided with: a group test matrix generating means for generating a group test matrix W, which is a parameter of a combined group test, on the basis of a plurality of items obtained by dividing an obtained message M; and a MAC tag list generating means that, while sharing results obtained by applying a pseudo random function to the items forming each row of the generated group test matrix W, sums the results, and then applies the summed results to pseudo random permutation to generate a MAC tag list T, which is a MAC tag list pertaining to the message M.

6 Claims, 11 Drawing Sheets

(51) Int. Cl.
*H04L 9/32* (2006.01)
*H04L 9/06* (2006.01)

(58) Field of Classification Search
USPC .......................................................... 713/171
See application file for complete search history.

(56) References Cited

OTHER PUBLICATIONS

Mihir Bellare, et al., "Keying Hash Functions for Message Authentication", CRYPTO'96, Proceedings, Lecture Notes in Computer Science, Jun. 1996, pp. 1-15, vol. 1109.

Michael T. Goodrich et al., "Indexing Information for Data Forensics", Applied Cryptography and Network Security, Third International Conference, ACNS 2005, Proceedings, 2005 Lecture Notes in Computer Science ISBN 3-540-26223-7, Jun. 7-10, 2005, pp. 206-221, New York, NY, USA.

Giovanni Di Crescenzo et al., "Corruption-Localizing Hashing", Computer Security—ESORICS 2009, 14th European Symposium on Research in Computer Security, Proceedings, Springer 2009 Lecture Notes in Computer Science ISBN 978-3-642-04443-4, Sep. 21-23, 2009, pp. 489-504, Saint-Malo, France.

Ely Porat et al., "Explicit Non-Adaptive Combinatorial Group Testing Schemes", ICALP 2008, Part I, LNCS 5125, 2008, pp. 748-759.

Phillip Rogaway, "Efficient Instantiations of Tweakable Blockciphers and Refinements to Modes OCB and PMAC", Advances in Cryptology-ASIACRYPT'04, LNCS 3329, Sep. 24, 2004, pp. 16-31.

Michel T. Goodrich et al., "Improved adaptive group testing algorithms with applications to multiple access channels and dead sensor diagnosis", Journal of Combinatorial Optimization, 2008, pp. 95-121, vol. 15, No. 1.

Kazuhiko Minematsu, "Parallelizable Rate-1 Authenticated Encryption from Pseudorandom Functions" [online], Cryptology ePrint Archive: Report 2013/628, Apr. 25, 2014 [retrieved on Dec. 24, 2015], Version: 20140425:052725, Retrieved from the Internet:URL:https://eprint.iacr.org/2013/628.pdf, NEC Corporation, Japan.

Giovanni Di Crescenzo et al., "Design and Analysis of DBMAC, an Error Localizing Message Authentication Code", IEEE Communications Society, Globecom 2004, Nov. 29, 2004, pp. 2224-2228, vol. 4.

Kazuhiko Minematsu, "Efficient Message Authentication Codes with Combinatorial Group Testing", ESORICS 2015 [online], [retrieved on Jan. 5, 2016], Sep. 2015, Retrieved from the Internet: URL:http:www1.spms.ntu.edu.sg/~ask/2015/slides/16_Kazuhiko.pdf, Sep. 23-25, Vienna, Austria.

Written Opinion for PCT/JP2015/005247, dated Jan. 19, 2016.

International Search Report for PCT/JP2015/005247, dated Jan. 19, 2016.

* cited by examiner

MAC TAG LIST GENERATING APPARATUS, MAC TAG LIST VERIFYING APPARATUS, MAC TAG LIST GENERATING METHOD, MAC TAG LIST VERIFYING METHOD AND PROGRAM RECORDING MEDIUM

CROSS REFERENCE TO RELATED APPLICATIONS

This a National Stage of Internal Application No. PCT/JP2015/005247 filed Oct. 16, 2015, claiming priority based on Japanese Patent Application No. 2014-216361 filed Oct. 23, 2014, the contents of all of which are incorporated herein by reference in their entirety.

TECHNICAL FIELD

The present invention relates to a message authentication technique that uses a common key cryptography or a hash function.

BACKGROUND ART

A Message Authentication Code (hereinafter, referred to as "message authentication" or "MAC") scheme is a technique for assuring the authenticity of a message by attaching, to the message, a tag that can be computed only by a person who knows a secret key. The use of the message authentication scheme enables, for example, detection of falsification committed by a third party during communication between two parties sharing a secret key.

Specifically, when a sender transmits a message and a tag to a receiver, the receiver computes a tag from the received message and determines whether the computed tag matches the received tag. By doing so, the receiver is able to determine whether the message is from a legitimate transmission source.

Fundamentals of input and output of MAC will be described. A case of transmitting a message M from Alice to Bob between two persons Alice and Bob sharing a secret key K will be described. Alice applies a MAC function MAC_K using K to M, obtains an authentication tag T=MAC_K(M), and transmits a message (M, T) to Bob.

Assume information received by Bob is (M', T'). Bob is able to know whether the received message (M', T') is a pair with the message and the authentication tag transmitted by Alice or not by determining whether T' matches MAC_K (M'). Accordingly, checking an existence of falsification can be possible.

Examples of such a scheme include a Cipher-based MAC (CMAC) in NPL 1 and a Hash-based MAC (HMAC) in NPL 2.

When using general message authentication, it is difficult to obtain information relating to a falsified position in a message. This is because a value of an authentication tag takes a random value that is different from a correct value when falsification is committed.

In regard to this, a technique is generally used that enables section-to-section checking by dividing a message into arbitrary sections and applying a MAC function to each of the sections, instead of applying a MAC function once to an entire message. By using this technique, a position of falsification committed on a message can be identified.

For example, when a message M is composed of m items M[1], ..., M[m], a tag is obtained for each of the items as follows.

$$T[1] = \text{MAC\_K}(M[1]),$$
$$T[2] = \text{MAC\_K}(M[2]),$$
$$\ldots,$$
$$T[m] = \text{MAC\_K}(M[m])$$

Then, (M, T[1], ..., T[m]) is transmitted to a receiver. The receiver is able to identify a falsified position based on received (M, T[1], ..., T[m]).

Examples of the method include applying MAC to data in a hard disk for each file or each disk sector. However, in the method, since m tags are generated with respect to m items, there is a problem of large increase in the amount of data to be stored.

On the other hand, as described in NPL 3, there is an approach that decomposes a message into a plurality of different-length subsequences that may overlap mutually, and applies a MAC to each of the subsequences.

For example, "Example 1" described in NPL 3 will be described. In "Example 1", when a message M is composed of seven items, (M[1], M[2], ..., M[7]) is decomposed into three subsequences as follows.

$$S[1] = (M[1], M[2], M[3], M[4])$$
$$S[2] = (M[1], M[2], M[5], M[6])$$
$$S[3] = (M[1], M[3], M[5], M[7])$$

Then, the MAC is applied to each of the subsequences, and three tags are computed as follows.
T[1]=MAC(S [1]),
T[2]=MAC(S [2]),
T[3]=MAC(S [3])

In this example, it becomes possible to reduce the number of tags to three, whereas for the case of applying a MAC to each item seven tags are required. Further, when a verification result for each (T[i], S[i]) at a time of verification is expressed by using a binarized value B[i] (that is, if "0", a MAC is correct; if "1", falsified), the falsified position can be identified as follows. In other words, when a result of checking a MAC tag for a message M at a certain point of time is as follows,
B[1]=0,
B[2]=1,
B[3]=0
since M[6] is an item contained in only B[2] whose result is "1", it can be identified that M[6] has been falsified. More accurately, in this example, in a case of falsification of one arbitrary item, the falsified item can be identified.

This nature indicates that when the number of falsified items is equal to or less than a given threshold value, the falsified items can be identified from the subsequences created in an efficient manner.

As described in NPL 3, which subsequences are needed and which falsified items can be identified as a result of decomposition are closely related to a combinatorial issue called combinatorial group testing (hereinafter, referred to as "CGT").

In CGT consisting of m items and s tests, an s-by-m binary matrix W (herein, called a "CGT matrix") is constructed, and testing is carried out in accordance with W. In other words, when the element in j-th row and i-th column of W is 1, this indicates that j-th test includes i-th item for testing.

When thinking about application to a database system, for example, a person who commits a fraud is unlikely to falsify a large amount of items at one time because of an actual restriction on the system or the like. Thus, combining CGT and MAC in this manner makes it possible to construct a database system capable of identifying a position of actually probable falsification with reduced total number of tags. Note that the nature of being capable of detecting, in regard to arbitrary falsification, the fact that the falsification has been committed is also found in the case of combining CGT and MAC similarly to the case of normal MAC.

Herein, as in Corruption-localizing hashing described in NPL 4, even when an unkeyed hash function is used instead of MAC, a similar effect can be expected under the premise that a hash value is stored in a secure place different from a message. In addition, even though an falsified item cannot be identified, it is usually possible to narrow down a range which may possibly falsified.

NPL 5 discloses a method of constructing tests with use of a coding theory. NPL 6 discloses Parallelizable MAC (PMAC) using n-bit blockcipher E.

CITATION LIST

Non-Patent Literature

NPT1: NIST Special Publication 800-38B, Morris Dworkin, Recommendation for Block Cipher Modes of Operation: The CMAC Mode for Authentication.

NPT2: Mihir Bellare, Ran Canetti, Hugo Krawczyk, "Keying Hash Functions for Message Authentication", CRYPTO '96, pp. 1-15, 1996.

NPT3: Michael T. Goodrich, Mikhail J. Atallah, Roberto Tamassia, "Indexing Information for Data Forensics", Applied Cryptography and Network Security, Third International Conference, ACNS 2005, New York, N.Y., USA, Jun. 7-10, 2005, Proceedings, 2005 Lecture Notes in Computer Science ISBN 3-540-26223-7, pp. 206-221.

NPT4: Giovanni Di Crescenzo, Shaoquan Jiang, Reihaneh Safavi-Naini, "Corruption-Localizing Hashing, Computer Security—ESORICS 2009, 14th European Symposium on Research in Computer Security, Saint-Malo, France, Sep. 21-23, 2009, Proceedings, Springer 2009 Lecture Notes in Computer Science ISBN 978-3-642-04443-4, pp. 489-504.

NPT5: Explicit Non-Adaptive Combinatorial Group Testing Schemes, Ely Porat, Amir Rothschild, ICALP 2008.

NPT6: P. Rogaway, Efficient Instantiations of Tweakable Block ciphers and Refinements to Modes OCB and PMAC, Advances in Cryptology—ASIACRYPT '04, LNCS 3329, pp. 16-31, 2004.

SUMMARY OF INVENTION

Technical Problem

When the technique described in NPL 3 or NPL 4 is executed by using a known hash function such as Secure Hash Algorithm (SHA)-2 or in accordance with a known message authentication scheme such as "CMAC", the amount of computation significantly increases in comparison with a basic method of computing only one tag. A general MAC function needs the amount of linear order computation for an input length. Thus, roughly speaking, computing s MACs for m items results in s-times greater computation amount.

More accurately speaking, an increase in the computation amount is dependent on which CGT is executed. For example, in constructing CGT capable of identifying falsification of one arbitrary item similarly to "Example 1", m items in number requires $\log_2 m$ (hereinafter, also depicted as "log_2m") tests in number (that is, tags in number). In addition, substantially all of the tests use m/2 messages.

As described above, when considering that the computation amount of MACs is proportional to the number of items to be processed, the execution of CGT results in a computation amount approximately (½)log_2m times greater than in a case of generating one tag in normal MAC.

Since in an application such as a database, an extremely large numerical value of m is expected, even (½)log_2m times leads to a remarkable increase in the computation amount. Further, in general, it is known that, for identification of falsification of d items, 0(d^2 log_2m) tests in number are required. Thus, if assuming that each of the tests includes about m/2 items, the computation amount becomes approximately (d^2/2)log_2m times greater. Note that "0" is a symbol indicating a computation amount.

In addition, depending on an application, a value of an item for which a tag has been already computed may need to be updated. However, when the technique described in NPL 3 or NPL 4 is implemented by using a known hash function or in accordance with a known message authentication scheme, re-computation of a tag involved in updating of an item cannot be efficiently performed, and all of tests concerned need to be recomputed from the beginning.

The invention of the present application has been made in light of the above-described problem, and a main object of the present invention is to provide a MAC tag list generating apparatus and the like capable of efficiently performing message authentication through which information relating to a falsified position as well as existence of falsification is obtained.

Solution to Problem

A MAC tag list generating apparatus according to one aspect of the present invention includes:

group test matrix generating means for generating, based on a plurality of items obtained by dividing an acquired message M, a group test matrix W that is a parameter for combinatorial group testing; and MAC tag list generating means for adding results of applying, for each of rows of the generated group test matrix W, a pseudorandom function to the items forming the row while sharing the results, applying a result of the addition to a pseudorandom permutation, and generating a MAC tag list T that is a list of MAC tags relating to the message M.

A MAC tag list verifying apparatus according to one aspect of the present invention includes:

acquiring means for acquiring a group test matrix W and a MAC tag list T from the MAC tag list generating apparatus;

verification MAC tag list generating means for calculating exclusive OR of results of applying a pseudorandom function to, of a plurality of items obtained by dividing an acquired message M, the items forming a row of the acquired group test matrix W while sharing the results, applying a result of the calculation to a pseudorandom permutation, and generating a MAC tag list T' that is a list of MAC tags relating to the message M; and verifying means for comparing the MAC tag list T acquired by the acquiring means with the MAC tag list T' generated by the verification MAC tag list generating unit and determining existence of falsification for each of the items included in the message M.

A MAC tag list updating apparatus according to one aspect of the present invention includes:

acquiring means for acquiring the group test matrix W and the one or more MAC tag lists Ts from the MAC tag list generating apparatus according to any one of claims 1 to 4; and MAC tag list updating means for acquiring an index i of an item to be updated and a value of the updated item M'[i], applying an inverse function of a pseudorandom permutation to, of the one or more MAC tag lists Ts, the MAC tag list T relating to a set B of all indexes of rows whose i-th column is "1" in the group test matrix W, and updates the MAC tag list T based on an obtained result of the application, the index i, the item M[i], the item M'[i], and the pseudorandom permutation.

A MAC tag list generating method according to one aspect of the present invention includes:

generating, based on a plurality of items obtained by dividing an acquired message M, a group test matrix W that is a parameter for combinatorial group testing; and adding results of applying, for each of rows of the generated group test matrix W, a pseudorandom function to the items forming the row while sharing the results, applying a result of the addition to a pseudorandom permutation, and generating a MAC tag list T that is a list of MAC tags relating to the message M.

Note that the object can be also accomplished by a computer program that causes a computer to implement a MAC tag list generating method having the above-described configurations, and a computer-readable recording medium that stores the computer program.

Advantageous Effects of Invention

The invention of the present application can obtain an advantageous effect of being capable of efficiently performing message authentication through which information relating to a falsified position as well as existence of falsification is obtained.

DESCRIPTION OF EMBODIMENTS

Example embodiments of the present invention will be described below in detail with reference to the drawings.

First Example Embodiment

Figure 1:
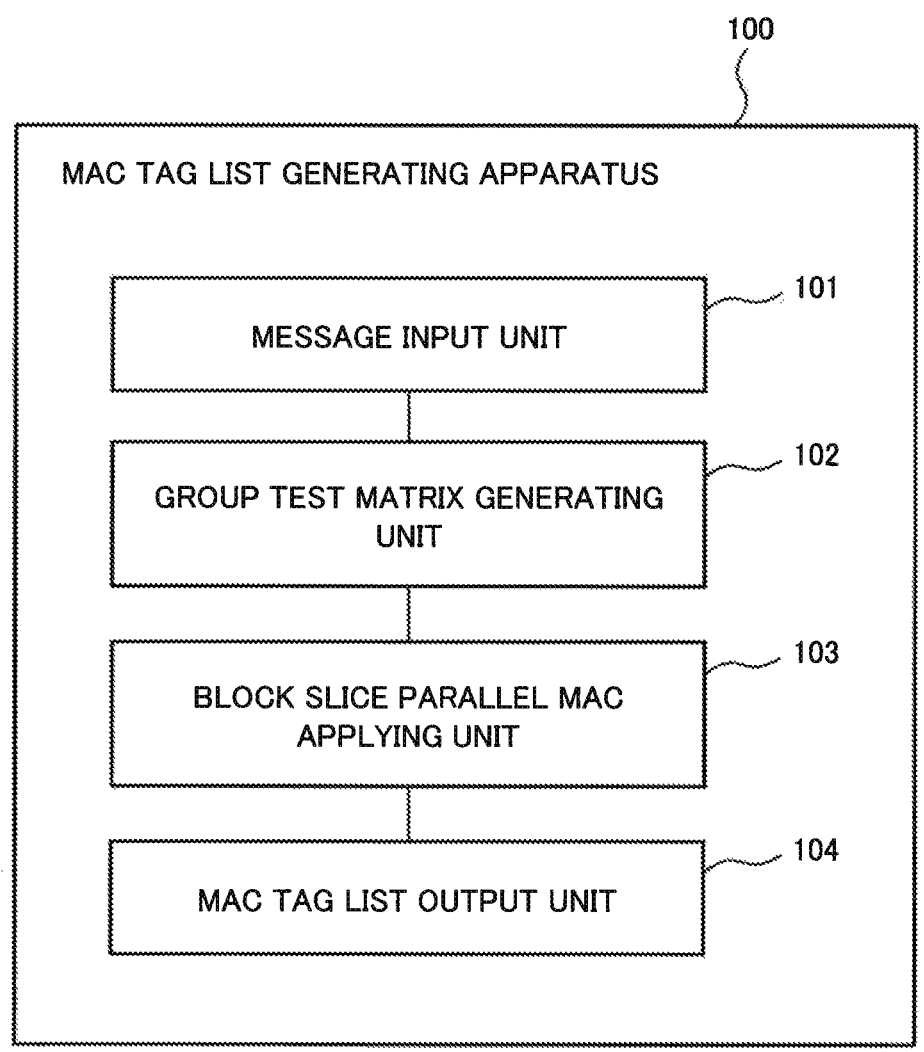
FIG. 1 is a diagram illustrating a configuration of a MAC tag list generating apparatus according to a first example embodiment of the present invention.

FIG. 1 is a diagram illustrating a configuration of a MAC tag list generating apparatus 100 according to a first example embodiment of the present invention. As illustrated in FIG. 1, the MAC tag list generating apparatus 100 includes a message input unit 101, a group test matrix generating unit 102, a block slice parallel MAC applying unit (MAC tag list generating means) 103, and a MAC tag list output unit 104.

The MAC tag list generating apparatus 100 can be implemented by a Central Processing Unit (CPU), a memory, and a disk (storage medium). Each of the units of the MAC tag list generating apparatus can be implemented by the CPU reading out a program stored in the disk to the memory and executing the program. Note that in the following description, the length of one item is n bits, insofar as there is no particular remark otherwise stated. In addition, "+" or "add" represents a bitwise exclusive OR (XOR).

Figure 2:
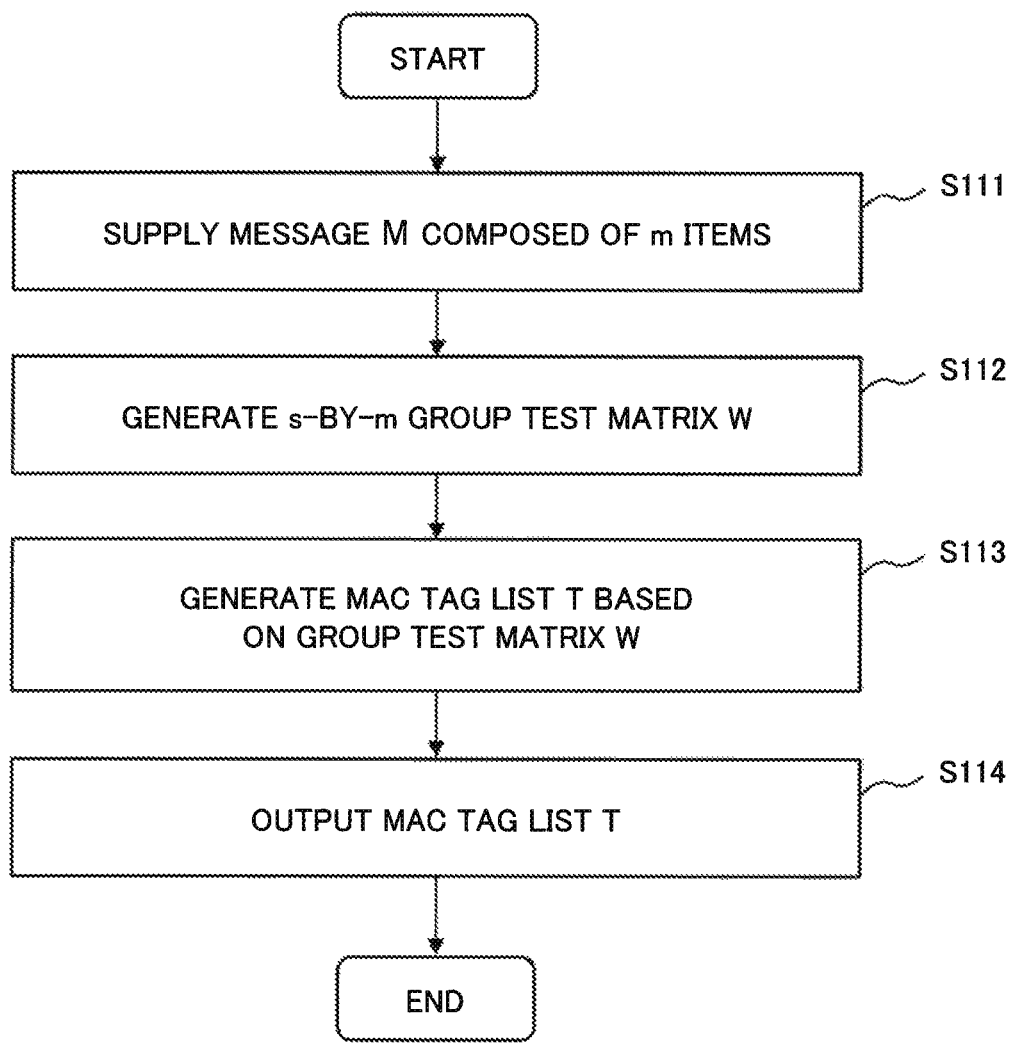
FIG. 2 is a flowchart illustrating a flow of generation of a MAC tag list by the MAC tag list generating apparatus according to the first example embodiment of the present invention.

Next, operations of the components of the MAC tag list generating apparatus 100 will be described. FIG. 2 is a flowchart illustrating a flow of generation of a MAC tag list by the MAC tag list generating apparatus 100. An operation of the MAC tag list generating apparatus 100 generating the MAC tag list will be described with reference to FIGS. 1 and 2.

The message input unit 101 supplies a message M as a subject to the group test matrix generating unit 102 (S111). For example, the message input unit 101 is implemented by a character input device such as a keyboard. In addition, the message input unit 101 may be a communication interface such as a Local Area Network (LAN) and a Universal Serial Bus (USB) for a computer, or an input interface for a program.

Herein, it is assumed that the message M is composed of m individual items M[1], . . . , M[m]. The items may have different lengths, and the items having the same value may be included. The message M may be, for example, information indicating one sector of a hard disk, information indicating one entry of a database, or one character of text information.

The group test matrix generating unit 102 generates, based on the message M acquired from the message input unit 101, a combinatorial group test matrix W for falsified position identification (S112). Specifically, the group test matrix generating unit 102 generates an s-by-m binary matrix W in accordance with the number of tests s (that is, the number of MACs) and the maximum value d of the number of identifiable falsified items.

For example, in the case of "Example 1" described in NPL 3, it has been shown that M=(M[1], M[2], . . . , M[7]) is decomposed into the following three subsequences.

$$S[1] = (M[1], M[2], M[3], M[4])$$
$$S[2] = (M[1], M[2], M[5], M[6])$$
$$S[3] = (M[1], M[3], M[5], M[7])$$

This means that a 3×7 group test matrix W is generated as follows.

[1111000]
W=[1100110]
[1010101]

In W, 1 appears at a position where each subsequence includes an item. Besides this, any existing method can be used for generating a group test matrix.

For example, NPL 3 discloses a method of generating a group test matrix by using a random number having a specific distribution. In addition, NPL 4 discloses a method of generating a group test matrix by using a cycle of subsequences.

In general, it is known that the number of tests s is O(d^2 log_2 m). In order to accomplish this, for example, the technique described in NPL 5 is known as a method of constructing tests with use of a coding theory.

Then, the block slice parallel MAC applying unit 103 generates, based on the s-by-m group test matrix W, a MAC tag list T composed of s MAC tags for the message M=(M[1], . . . , M[m]) composed of m items (S113).

The MAC tag list output unit 104 outputs the MAC tag list T generated by the block slice parallel MAC applying unit 103 to a computer display, a printer, and the like (S114).

Generation of the MAC tag list by the block slice parallel MAC applying unit 103 will be described below in detail.

For generation of a MAC tag, a pseudorandom function (PRF) F that is a (variable-length input/fixed-length output) function receiving variable-length input and performing fixed-length output, and a (fixed-length input/output) pseudorandom permutation (PRP) G receiving fixed-length input and performing fixed-length output are used.

For illustrative convenience, it is assumed that the output length of F is equal to the input/output length of G. When the output length of F is different from the input/output length of G, padding or reduction may be used for the output of F as appropriate to make the lengths equal.

The role of W is to indicate which item is included in MAC tag computation performed by i-th row vector in i-th test.

Specifically, first, the block slice parallel MAC applying unit 103 links i-th item M[i] with an index i for all indexes i of columns where 1 appears in j-th row of W, inputs the linked item and index to F, and obtains an output F(i, M[i]).

Next, the block slice parallel MAC applying unit 103 calculates a sum (exclusive OR) of F(i, M[i]) for the all i's where 1 appears, and inputs a result of the calculation as Z to G. An output G(Z) obtained from G is determined as a MAC tag T[j] that corresponds to j-th test.

This operation is performed for all j=1, . . . , s, and a MAC tag list T=(T[1], . . . , T[s]) is generated.

F and G can be constructed by using a standard blockcipher or a hash function. For example, when the bit length of each item is at most n bits, F and G can be constructed similarly to PMAC using n-bit blockcipher E in NPL 6. Note that a blockcipher having a block size of n bits (n is an integer equal to or greater than 1) is generally called n-bit blockcipher.

Specifically, when the indexes of columns where 1 appears in j-th row are i[1], . . . , i[h], and assuming that F(i, M[i]) is E(mult(const(i), L)+M[i]), Z=F(i[1], M[i[1]])+F(i[2], M[i[2]])+ . . . +F(i[h], M[i[h]]), and G(Z) is E(mult(const', L)+Z), then G(Z) becomes T[j].

In this connection, L represents E(const"), const(i), const', and const" represent elements of Galois field GF(2^n), mult(A, B) represents multiplication of A by B that are elements of Galois field GF(2^n), and A+B represents addition of A to B of Galois field GF(2^n), in other words, bitwise exclusive OR (XOR), respectively.

Herein, a condition is required that const(1), . . . , const(m), const', const" are different from one another in terms of security. For example, it is possible to set const(i)=2^i, const'=0, and const"=3 in the same manner as PMAC. This can be considered as applying an i-dependent mask to inputs of a blockcipher.

However, although the last block of a message is not applied to E but the exclusive OR (XOR) is directly calculated in PMAC, this cannot be performed in the present example embodiment in terms of security.

Note that when the length of each item is n bits or more, the variable-length input/fixed-length output pseudorandom function F may be realized directly by using a keyed hash function H such as HMAC, in other words, F(i, M[i]) may be realized by giving linked i and M[i] to H. As a more efficient scheme, F(i, M[i]) may be realized by applying a mask corresponding to i to first n bits of input H in the same manner as described above. In any of the cases, the pseudorandom permutation G can be realized by using a blockcipher such as an Advanced Encryption Standard (AES).

Figure 3:
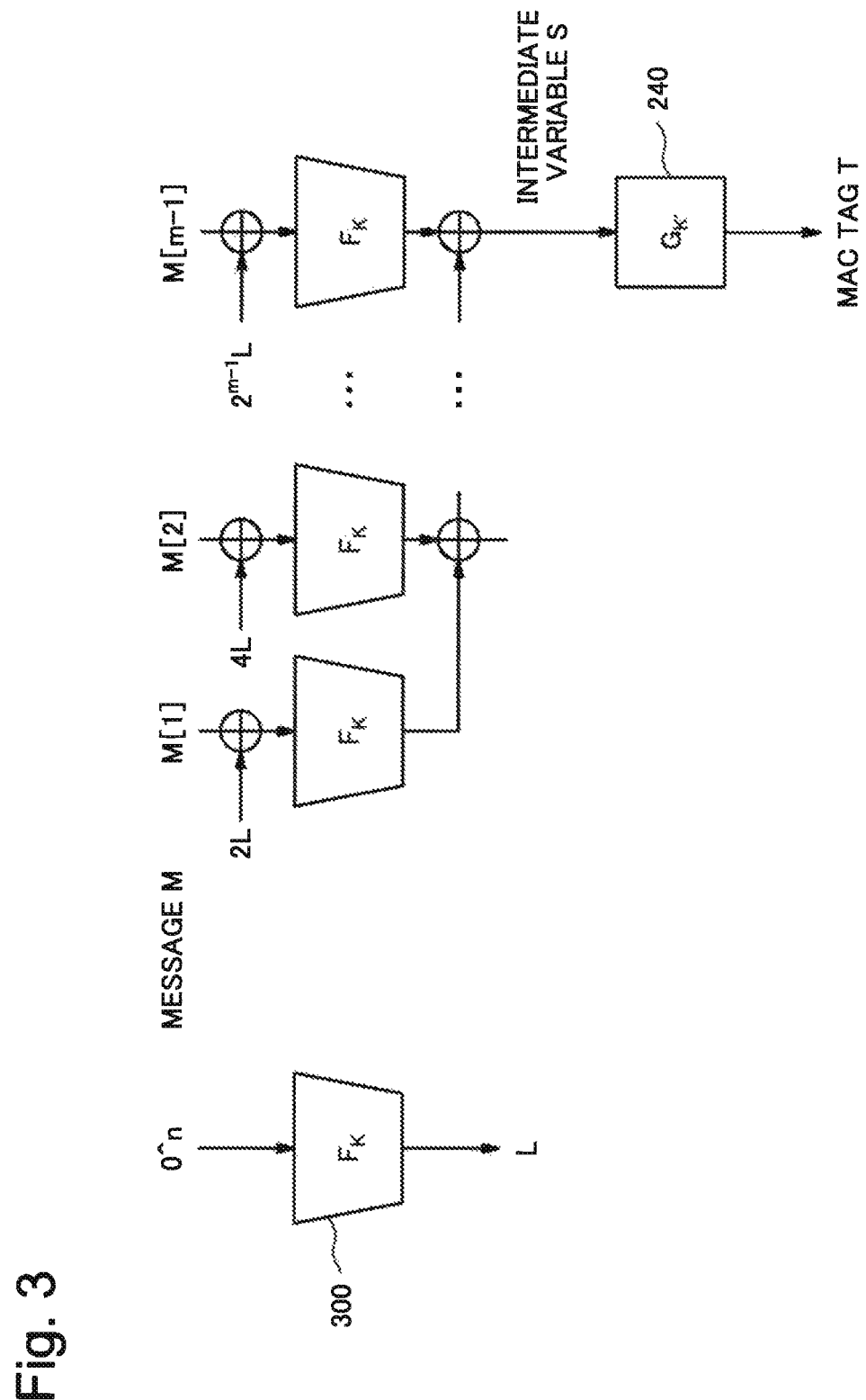
FIG. 3 is a diagram describing a process of calculating a MAC tag T by the MAC tag list generating apparatus according to the first example embodiment of the present invention.

FIG. 3 is a diagram describing an example of calculating a MAC tag T by using the variable-length input/fixed-length output pseudorandom function F and the fixed-length input/output pseudorandom permutation G as described above. $F_K$ 300 illustrated in FIG. 3 indicates F (K, *) that is a pseudorandom function to which variable-length data (for example, 0^n (all-zero n-bit sequence)) are input and that outputs fixed-length data (for example, L). In addition, $G_{K'}$ 240 indicates a pseudorandom permutation G(K') to which an intermediate variable S is input and that outputs a MAC tag T.

Herein, computation of MAC tags can be performed in a significantly efficient manner by parallelly computing MAC tags while sharing an intermediate result of computation (intermediate variable), rather than individually computing MAC tags for each test. This is because two tests including M[i] both use F(i, M[i]).

For example, a case of "Example 1" above will be described. When three state variables Z[1], Z[2], and Z[3] are prepared whose initial values are respectively 0, the MAC tag list can be computed according to the following procedure. In other words, according to the following procedure, Z[1]<=F (1, M [1]) (where "<=" represents substitution)
Z[2]<=F (1, M [1])
Z[3]<=F (1, M [1])
Z[1]<=Z[1] +F(2, M[2])
Z[2]<=Z[2] +F(2, M[2])
Z[1]<=Z[1] +F(3, M[3])
Z[3]<=Z[3] +F(3, M[3])
Z[1]<=Z[1] +F(4, M[4])
Z[2]<=Z[2] +F(5, M[5])

Z[3]<=Z[3] +F(5, M[5])
Z[2]<=Z[2] +F(6, M[6])
Z[3]<=Z[3] +F(7, M[7])
T[1]<=G(Z[1])
T[2]<=G(Z[2])
T[3]<=G(Z[3])

three MAC tag lists can be computed. At this time, the number of times of calling F is seven, which is the same as the number of items (to be described later in detail with reference to FIG. 5).

If computing this by using normal MAC, for example, using CMAC in NPL 1 to compute MACs for the following subsequences, $$S[1] = (M[1], M[2], M[3], M[4])$$

$$S[2] = (M[1], M[2], M[5], M[6])$$

$$S[3] = (M[1], M[3], M[5], M[7])$$

computation cannot be shared except for the initial part being the same as in each subsequence. Accordingly, the overall amount of computation is further increased.

When using PMAC in NPL 6, a shareable part is further increased, but still a large part usually remains unshareable.

Figure 4:
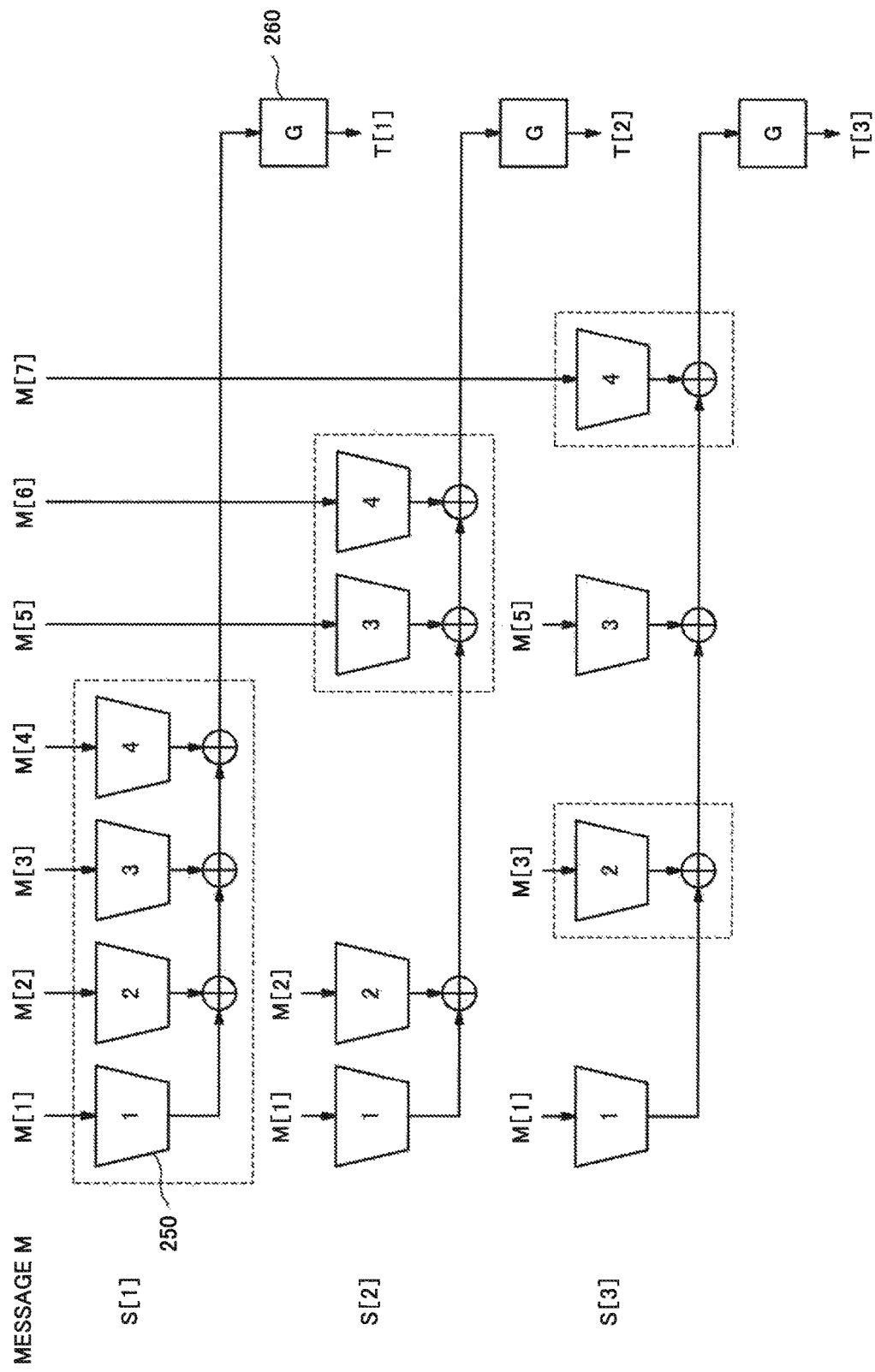
FIG. 4 is a diagram describing a process of calculating a MAC tag T by applying PMAC to S[1] through S[3]
Figure 5:
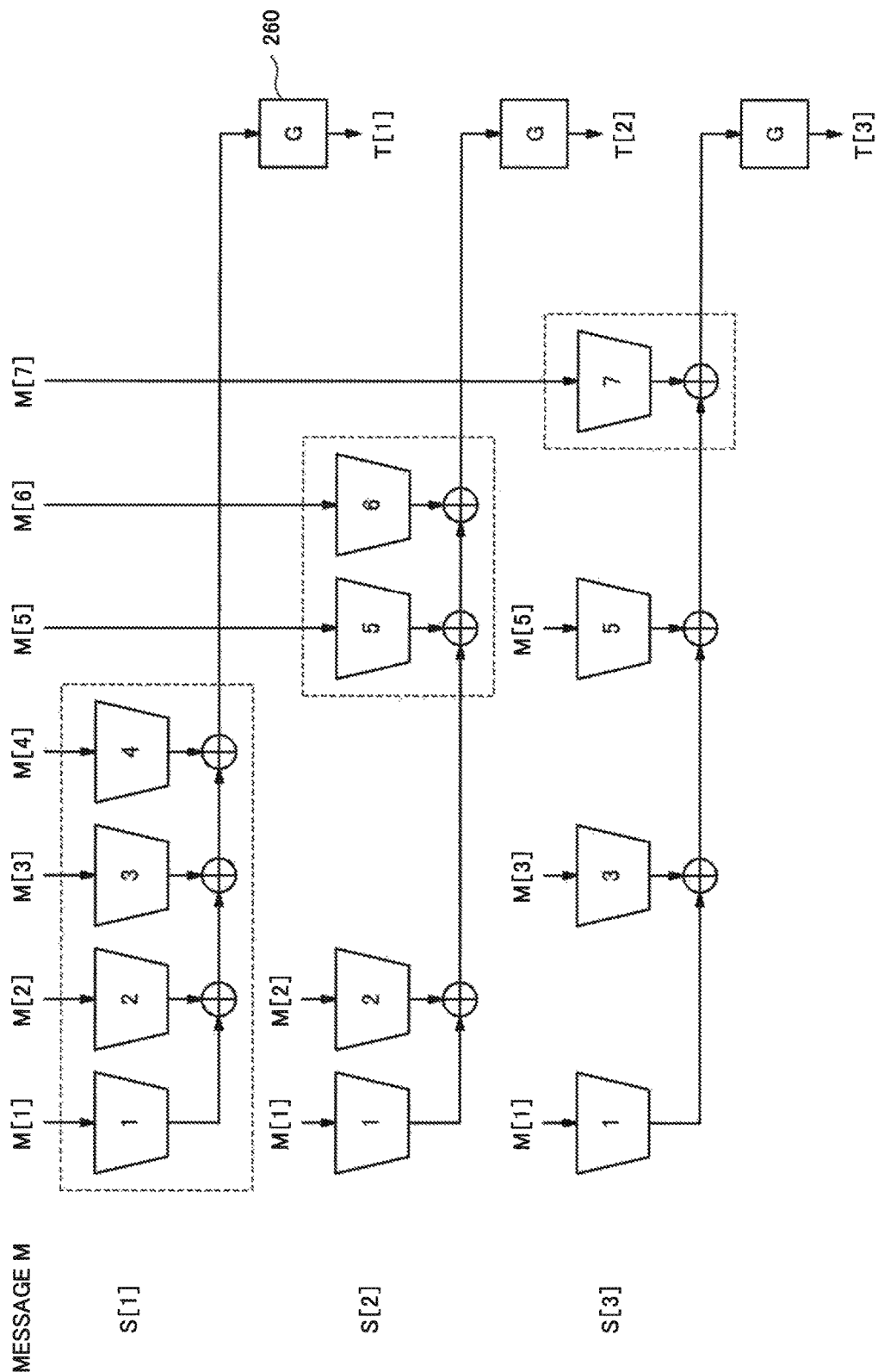
FIG. 5 is a diagram describing a process of calculating a MAC tag T by applying a scheme of the MAC tag list generating apparatus according to the first example embodiment of the present invention to S[1] through S[3]

FIG. 4 is a diagram describing a process of calculating a MAC tag T by applying PMAC to S[1] through S[3]. In addition, FIG. 5 is a diagram describing a process of calculating a MAC tag T by applying a scheme of the present example embodiment to S[1] through S[3]. In FIG. 4, a function 250 represents a pseudorandom function F to which a variable-length item M[1] is input and that outputs a fixed-length F(1, M[1]) similarly to FIG. 3. In addition, in FIG. 4, G 260 represents a pseudorandom permutation G to which exclusive OR of F(1, M[1]), . . . , F(4, M[4]) is input and that outputs a MAC tag T[1]. In FIGS. 4 and 5, shapes that are the same as those of the function 250 and G 260 respectively represent the same meanings.

As illustrated in FIG. 4, when PMAC is used for S[1] through S[3], since a result of computation with respect to M[3] becomes a different value in the process of calculating S[2], the result cannot be shared with another test. Thus, in a case illustrated in FIG. 4, computation is necessary for sections enclosed by dotted lines. In other words, it is necessary to call F eight times.

In contrast to this, as illustrated in FIG. 5, the scheme according to the present example embodiment enables sharing of the result of computation with respect to M[3] with another test. Thus, in a case illustrated in FIG. 5, computation needs to be performed for sections enclosed by dotted lines. In other words, it is only necessary to call F seven times. In the examples illustrated in FIGS. 4 and 5, although there is only one-time difference in the number of times of calling F, this difference enlarges as the number of items increases. For example, when there are fifteen items in number, the difference in the number of times of calling F is five times, for which the reduction in the number of times of calling has a great advantageous effect.

A computation procedure according to the present example embodiment generalizes the above example. In other words, according to the present example embodiment, the number of times of calling F is m and the number of times of calling G is s for an arbitrary s-by-m group test matrix. In other words, the computation amount according to the present example embodiment is proportional to (s+m) regardless of contents of a matrix. In contrast to this, in a case of using normal MAC, if a computation result cannot be shared at all and a matrix is sufficiently dense, the number of times of calling F is approximately s×m times. Thus, the present example embodiment enables significant reduction in the computation amount.

As described above, in the present example embodiment, computation of MAC tags are parallelly performed while sharing an intermediate variable, rather than individually computing MAC tags. In the present example embodiment, this method is called "block slice parallel MAC".

The block slice parallel MAC according to the present example embodiment can be also regarded as follows. In other words, a parallelly executable MAC such as PMAC can be also regarded that, when a value of i-th component of a row vector of a group test matrix takes "1", a pseudorandom number generated by using information on an item itself and an index i is added to an intermediate variable in MAC, and when the component takes "0", an all-zero value is added regardless of a value of an item.

In addition, in a case of performing the block slice parallel MAC according to the present example embodiment, it is difficult for an attacker to predict a MAC tag for an arbitrary message when F is a pseudorandom function, similarly to a case of performing normal MAC in each test.

This is because, when thinking about arbitrary different sets B and B' of item indexes (excluding an empty set, however), a probability that a value of a sum of F(i, M[i]) calculated for all i's included in B and a value of a sum of F(j, M[j]) calculated for all j's included in B' match each other is extremely low regardless of a value of an item.

Since the MAC tags are each a value obtained by applying the value of the calculated sum of F(i, M[i]) to the pseudorandom permutation G, output of G is difficult to predict unless inputs to G match each other. Accordingly, making falsification becomes difficult.

As described above, according to the present first example embodiment, in generating MAC tags relating to rows (that is, tests) that have "1" in common at a certain column of the s-by-m group test matrix W, an output F(i, M[i]) obtained by giving each i-th item to the pseudorandom function can be shared with one another. By applying a sum Z of F(i, M[i]) for all i's to the pseudorandom permutation G, a MAC tag is generated. By employing the above configuration, the present first example embodiment makes the computation amount for generating the MAC tag list proportional to (s+m). Therefore, an advantageous effect of being capable of efficiently executing message authentication that uses combinatorial group testing to identify existence of falsification and a falsified position, is obtained while preventing increase in the computation amount.

Second Example Embodiment

Next, a second example embodiment of the present invention will be described with reference to the drawings.

Figure 6:
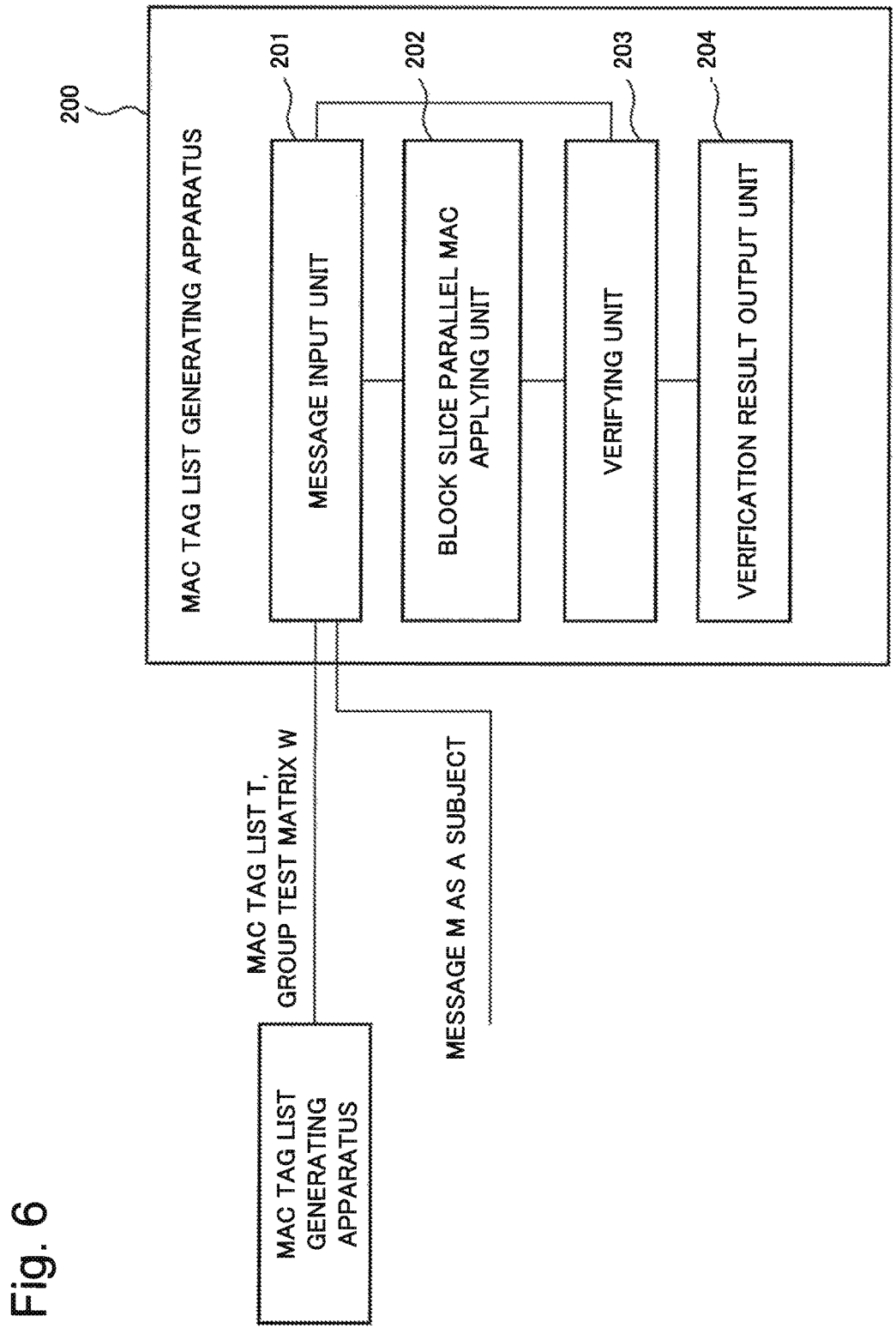
FIG. 6 is a block diagram illustrating a configuration of a MAC tag list verifying apparatus according to a second example embodiment of the present invention.

FIG. 6 is a block diagram illustrating a configuration of a MAC tag list verifying apparatus 200 according to the second example embodiment of the present invention. As illustrated in FIG. 6, the MAC tag list verifying apparatus 200 includes a message input unit (acquiring means) 201, a block slice parallel MAC applying unit (verification MAC tag list generating means) 202, a verifying unit (verifying means) 203, and a verification result output unit 204.

The MAC tag list verifying apparatus 200 can be implemented by a CPU, a memory, and a disk (storage medium). Each of the units of the MAC tag list verifying apparatus 200 can be implemented by the CPU reading out a program stored in the disk to the memory and executing the program.

Figure 7:
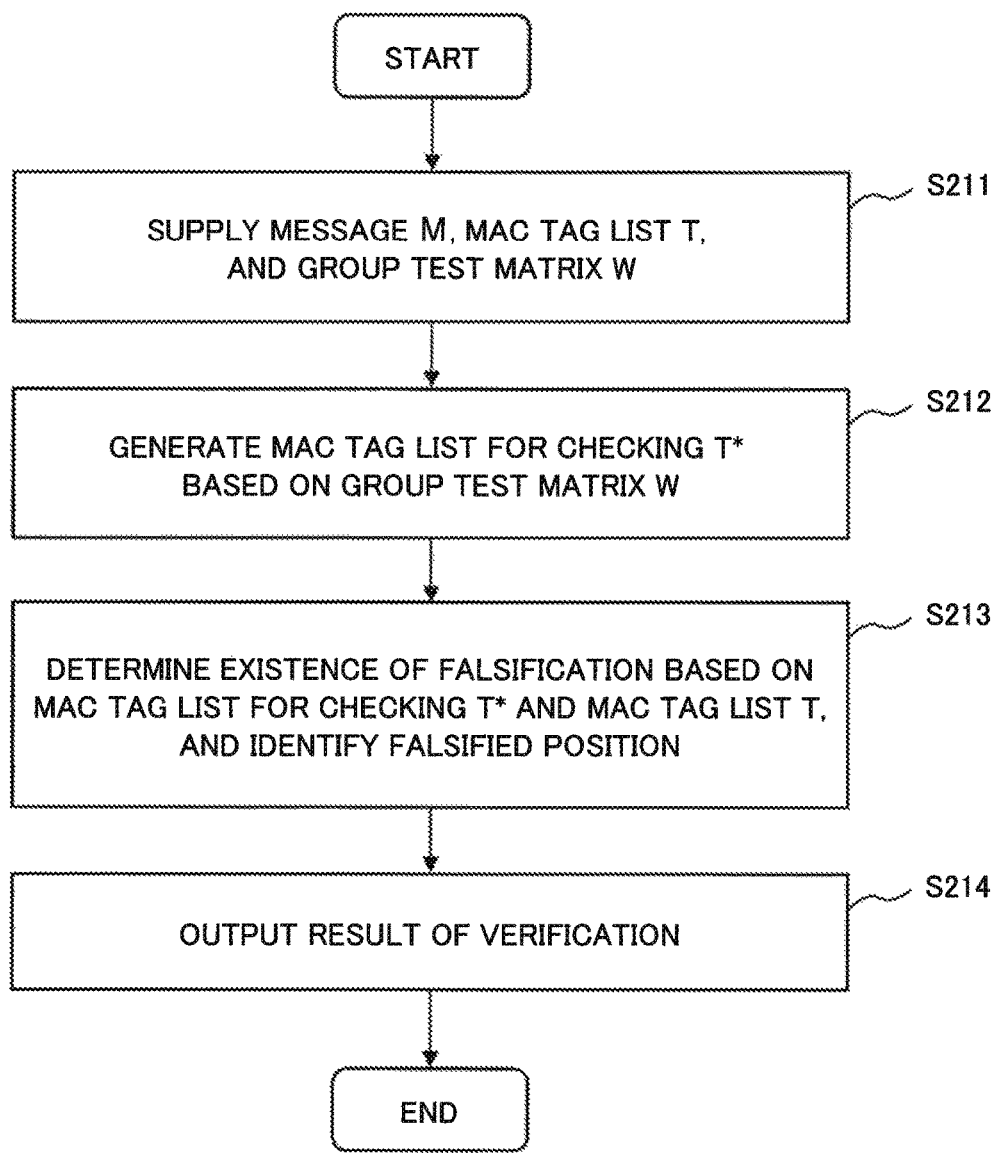
FIG. 7 is a flowchart illustrating a flow of verification of a MAC tag list by the MAC tag list verifying apparatus according to the second example embodiment of the present invention.

Next, operations of the components of the MAC tag list verifying apparatus 200 will be described. FIG. 7 is a flowchart illustrating a flow of verification of the MAC tag list by the MAC tag list verifying apparatus 200. An operation of the MAC tag list verifying apparatus 200 verifying the MAC tag list will be described with reference to FIGS. 6 and 7.

The message input unit 201 supplies a message M as a subject to the block slice parallel MAC applying unit 202 (S211). In addition, the message input unit 201 supplies, to the block slice parallel MAC applying unit 202, the MAC tag list T that is output from the MAC tag list generating apparatus 100 and an s-by-m binary group test matrix W, which have been described in the first example embodiment (S211). The message input unit 201 is implemented by, for example, a character input device such as a keyboard. In addition, the message input unit 201 may be a communication interface such as a LAN or a USB for a computer, or an input interface for a program.

Herein, similarly to the first example embodiment, it is assumed that the message M is composed of m individual items M[1], . . . , M[m].

The block slice parallel MAC applying unit 202 has the same configuration as that of the block slice parallel MAC applying unit 103 of the MAC tag list generating apparatus 100 according to the first example embodiment. In other words, the block slice parallel MAC applying unit 202 applies, based on the group test matrix W, block slice parallel MAC using a pseudorandom function F and a pseudorandom permutation G, which have been described in the first example embodiment, to the message M as a subject. By doing so, the block slice parallel MAC applying unit 202 generates a MAC tag list composed of s MAC tags (S212). Herein, the MAC tag list generated by the block slice parallel MAC applying unit 202 is defined as T*=(T*[1], . . . , T*[s]) and is called a "MAC tag list for checking".

The verifying unit 203 compares the MAC tag list T acquired from the message input unit 201 with the generated MAC tag list for checking T*, and determines existence of falsification of the message M and, if any falsification is found, identifies an falsified position (item) (S213).

The verification result output unit 204 outputs a result of the determination on existence of falsification performed by the verifying unit 203 and information identifying a falsified item to a computer display, a printer, and the like (S214).

The operation of the verifying unit 203 will be specifically described below.

The verifying unit 203 detects a difference between T*=(T*[1], . . . , T*[s]) and T=(T[1], . . . , T[s]) for each entry. The verifying unit 203 creates a binary vector B=(B[1], . . . , B[s]) where "0" indicates a case in which the difference is zero and "1" indicates a case in which the difference is non-zero. The verifying unit 203 then performs a predetermined procedure (decoding) on B and outputs a result thereof.

Specifically, when entries of B are all "0", the verifying unit 203 determines that no falsification is present, and in other cases, determines that at least one of all items is falsified.

When determining that falsification is present, the verifying unit 203 further extracts, for all i=1, . . . , s where B[i]=0, i-th row vector V=(V[1], . . . , V[m]) of the group test matrix W acquired from the message input unit 201. The verifying unit 203 determines that M[j] is not falsified for all j's where V[j]=1.

The verifying unit 203 then determines that falsification is present for all items that have not been determined as being not falsified as a result of the above processing.

In a case in which the group test matrix W satisfies a nature called d-disjunctive, if the number of falsified items is equal to or less than d, all the falsified items can be identified through the above procedure.

In addition, since no situation occurs in which an item determined as being not falsified is actually falsified as described in NPL 4, there is generally an advantageous effect of narrowing down a range which may possibly be falsified regardless of whether the group test matrix W is d-disjunctive or not.

As described above, according to the present second example embodiment, the block slice parallel MAC applying unit 202 applies, to the message M as a subject, the group test matrix W generated by the MAC tag list generating apparatus 100 and the block slice parallel MAC using the pseudorandom function F and the pseudorandom permutation G. By doing so, the block slice parallel MAC applying unit 202 generates the MAC tag list for checking T*. The verifying unit 203 compares the MAC tag list T acquired from the message input unit 201 with the generated MAC tag list for checking T*, determines existence of falsification of the message M and identifies a falsified position. By employing this configuration, the present second example embodiment can obtain an advantageous effect of being capable of efficiently executing message authentication that uses combinatorial group testing to identify existence of falsification and the falsified position while preventing increase in the computation amount.

Third Example Embodiment

Next, a third example embodiment of the present invention will be described with reference to the drawings.

Figure 8:
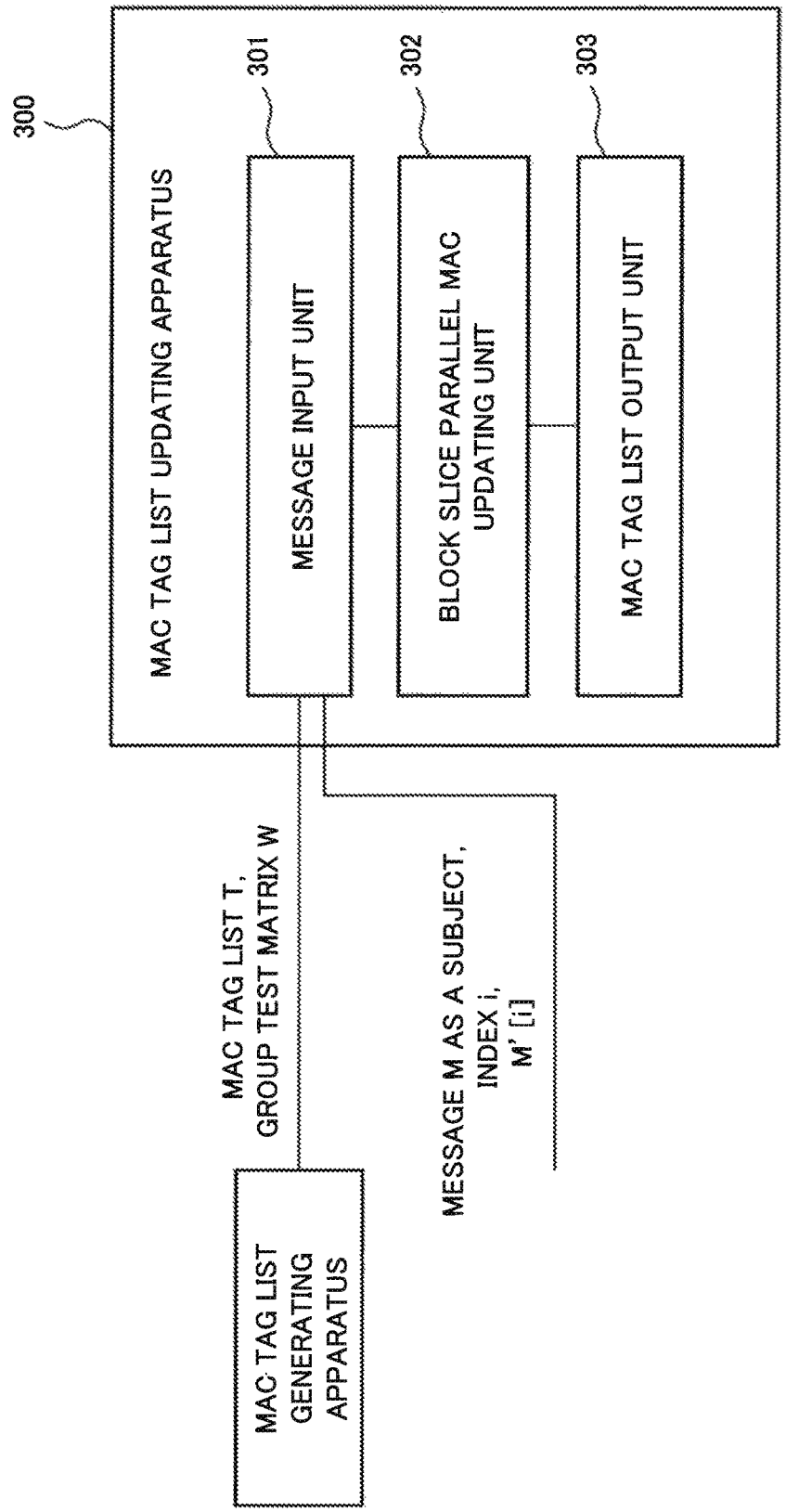
FIG. 8 is a block diagram illustrating a configuration of a MAC tag list updating apparatus according to a third example embodiment of the present invention.

FIG. 8 is a block diagram illustrating a configuration of a MAC tag list updating apparatus 300 according to the third example embodiment of the present invention. As illustrated in FIG. 8, the MAC tag list updating apparatus 300 includes a message input unit 301, a block slice parallel MAC updating unit (MAC tag list updating means) 302, and a MAC tag list output unit 303.

The MAC tag list updating apparatus 300 can be implemented by a CPU, a memory, and a disk (storage medium). Each of the units of the MAC tag list updating apparatus 300 can be implemented by the CPU reading out a program stored in the disk to the memory and executing the program.

In the present third example embodiment, updating of the MAC tag list will be described in a case in which any item of a message M composed of m individual items M[1], . . . , M[m], which has been described in the above first example embodiment, is updated. In other words, description will be given about updating of the MAC tag list by the block slice parallel MAC updating unit 302 instead of re-computing for the entire message M when any item of the message M is updated.

Figure 9:
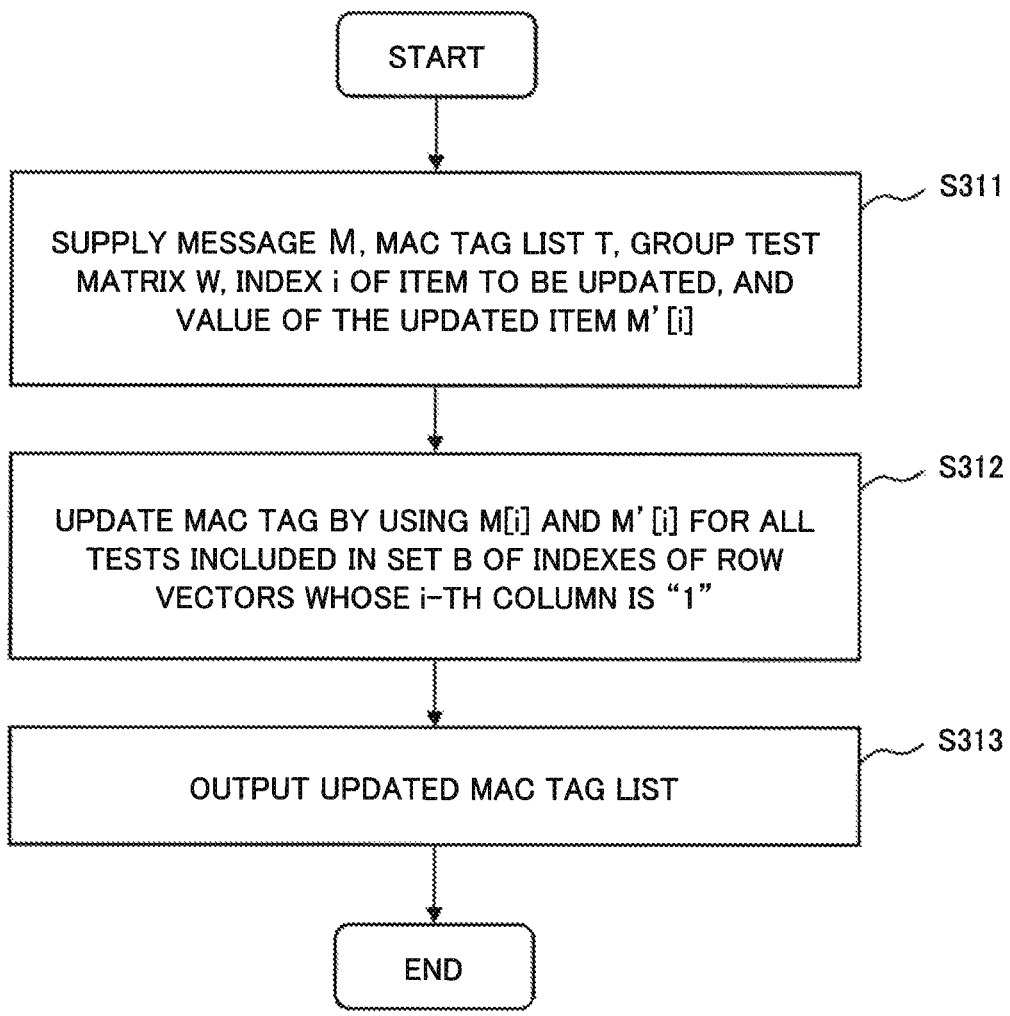
FIG. 9 is a flowchart illustrating a flow of updating of a MAC tag list by the MAC tag list updating apparatus according to the third example embodiment of the present invention.

Next, operations of the components of the MAC tag list updating apparatus 300 will be described. FIG. 9 is a flowchart illustrating a flow of updating of the MAC tag list by the MAC tag list updating apparatus 300. An operation of the MAC tag list updating apparatus 300 updating the MAC tag list will be described with reference to FIGS. 8 and 9.

The message input unit 301 supplies a message M as a subject to the block slice parallel MAC updating unit 302 (hereinafter, also referred to simply as the "updating unit 302") (S311). In addition, the message input unit 201 supplies, to the updating unit 302, the MAC tag list T that is output from the MAC tag list generating apparatus 100 and an s-by-m binary group test matrix W, which have been described in the first example embodiment (S311).

Further, the message input unit 301 supplies an index i of an item to be updated and a value of the updated item M'[i] to the updating unit 302 (S311).

The message input unit 301 is implemented by, for example, a character input device such as a keyboard. In addition, the message input unit 301 may be a communication interface such as a LAN or a USB for a computer, or an input interface for a program.

Herein, similarly to the first example embodiment, it is assumed that the message M is composed of m individual items M[1], . . . , M[m], and the index i of the item to be updated is from 1 to m.

The updating unit 302 updates, based on the group test matrix W that is output from the MAC tag list generating apparatus 100 according to the first example embodiment, a MAC tag by using M[i] and M'[i] for all tests included in a set of indexes B={i[1], . . . , i[h]} of row vectors whose i-th column is "1" (S312).

The MAC tag list output unit 303 outputs the MAC tag list updated by the updating unit 302 to a computer display, a printer, and the like (S313).

The operation of the updating unit 302 will be specifically described below.

The updating unit 302 extracts all indexes of row vectors whose i-th column is "1" from the group test matrix W that is output from the MAC tag list generating apparatus 100 according to the first example embodiment, and defines the indexes as a set B={i[1], . . . , i[h]}.

The MAC tag computation is performed using M[i] for tests whose index is included in B and thereby when M[i] is updated to M'[i], M'[i] should be used for calculating a MAC tag. This can be realized through a procedure similar to updating of a tag in PMAC of NPL 6. Specifically, the following procedure is performed.

First, the updating unit 302 applies, by using the variable-length input/fixed-length output pseudorandom function F and the fixed-length input/output pseudorandom permutation G, which have been described in the first and second example embodiments, an inverse function G^−1 of G to a list among the MAC tag list T=(T[1], . . . , T[s]) whose index is included in B, in other words, (T[i[1]], . . . , T[i[h]]).

Then, the updating unit 302 adds F(i, M[i]) and F(i, M'[i]) to obtained intermediate variables Z[i[1]], . . . , Z[i[h]], and obtains new intermediate variables Z'[i[1]], . . . , Z'[i[h]] (Z'[i[j]]=Z[i[j]] +F(i, M[i])+F(i, M'[i]), where j=1, . . . , h).

Further, the updating unit 302 applies G to each of the intermediate variables Z', and obtains the following.

$$T'[i[1]] = G(Z['i[1]]),$$
$$\ldots,$$
$$T'[i[h]] = G(Z['i[h]])$$

The updating unit 302 updates a value of a tag by using T'[i[1]], . . . , T'[i[h]] thus obtained.

The updating unit 302 updates remaining tags without changing values (when i is not included in B, T'[i]=T[i]), and outputs an updated MAC tag list T'=(T'[1], . . . , T'[s]).

The above procedure ends when F is called 2h times and G and G^−1 are called h times for the size h of B. Thus, the MAC tag list can be updated through the above update procedure more efficiently than re-computation for the entirety having the computation amount proportional to (s+m).

As described above, according to the present third example embodiment, the block slice parallel MAC updating apparatus 302 updates, based on the group test matrix W that is output from the MAC tag list generating apparatus 100 according to the first example embodiment, a MAC tag regarding the following. In other words, the block slice parallel MAC updating unit 302 updates a MAC tag by using M[i] and M'[i] for all tests included in the set of indexes B={i[1], . . . , i[h]} of row vectors whose i-th column is "1". By employing this configuration, the present third example embodiment can obtain an advantageous effect of being capable of efficiently executing re-computation of a MAC tag when a value of an item is updated.

Note that in each of the above example embodiments, the MAC tag list generating apparatus, the MAC tag list verifying apparatus and the MAC tag list updating apparatus have been described respectively as being individual apparatuses. However, the MAC tag list verifying apparatus may be configured to include the MAC tag list generating apparatus. Alternatively, the MAC tag list updating apparatus may be configured to include the MAC tag list generating apparatus. Alternatively, an apparatus may be configured to include the MAC tag list generating apparatus, the MAC tag list verifying apparatus and the MAC tag list updating apparatus.

Fourth Example Embodiment

Figure 10:
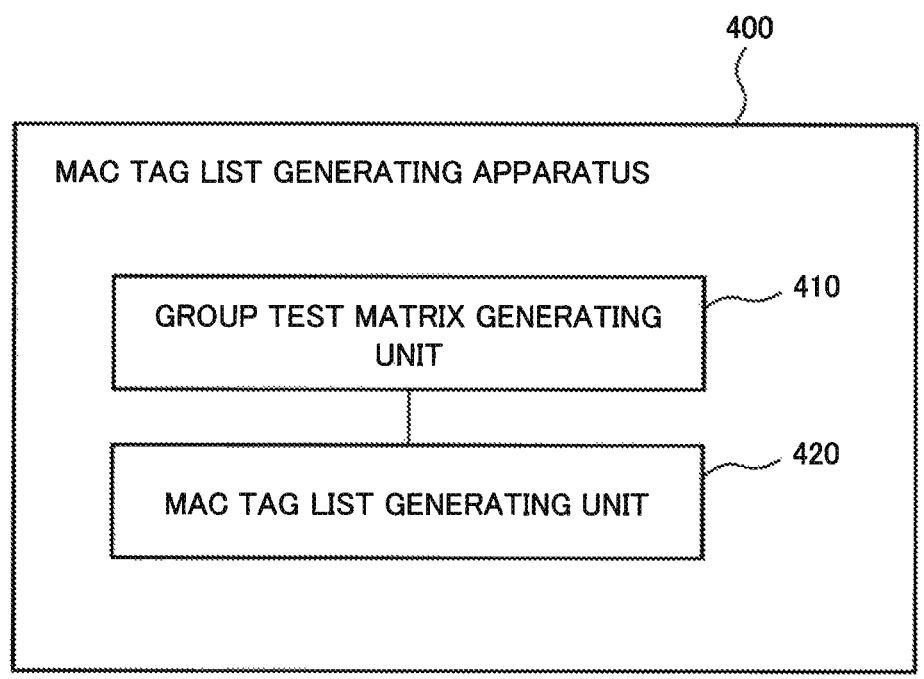
FIG. 10 is a block diagram illustrating a configuration of a MAC tag list generating apparatus according to a fourth example embodiment of the present invention.

FIG. 10 is a diagram illustrating a configuration of a MAC tag list generating apparatus 400 according to a fourth example embodiment of the present invention. As illustrated in FIG. 10, the MAC tag list generating apparatus 400 includes a group test matrix generating unit 410 and a MAC tag list generating unit 420.

The group test matrix generating unit 410 generates, based on a plurality of items obtained by dividing an acquired message M, a group test matrix W that is a parameter for combinatorial group testing.

The MAC tag list generating unit 420 adds results of applying, for each of rows of the generated group test matrix W, a pseudorandom function to the items forming the row while sharing the results. The MAC tag list generating unit 420 then applies a result of the addition to a pseudorandom permutation, and thereby generates a MAC tag list T that is a list of MAC tags relating to the message M.

By employing the above configuration, the present fourth example embodiment can obtain an advantageous effect of being capable of efficiently performing message authentication through which information relating to the falsified position as well as existence of falsification is obtained.

Figure 11:
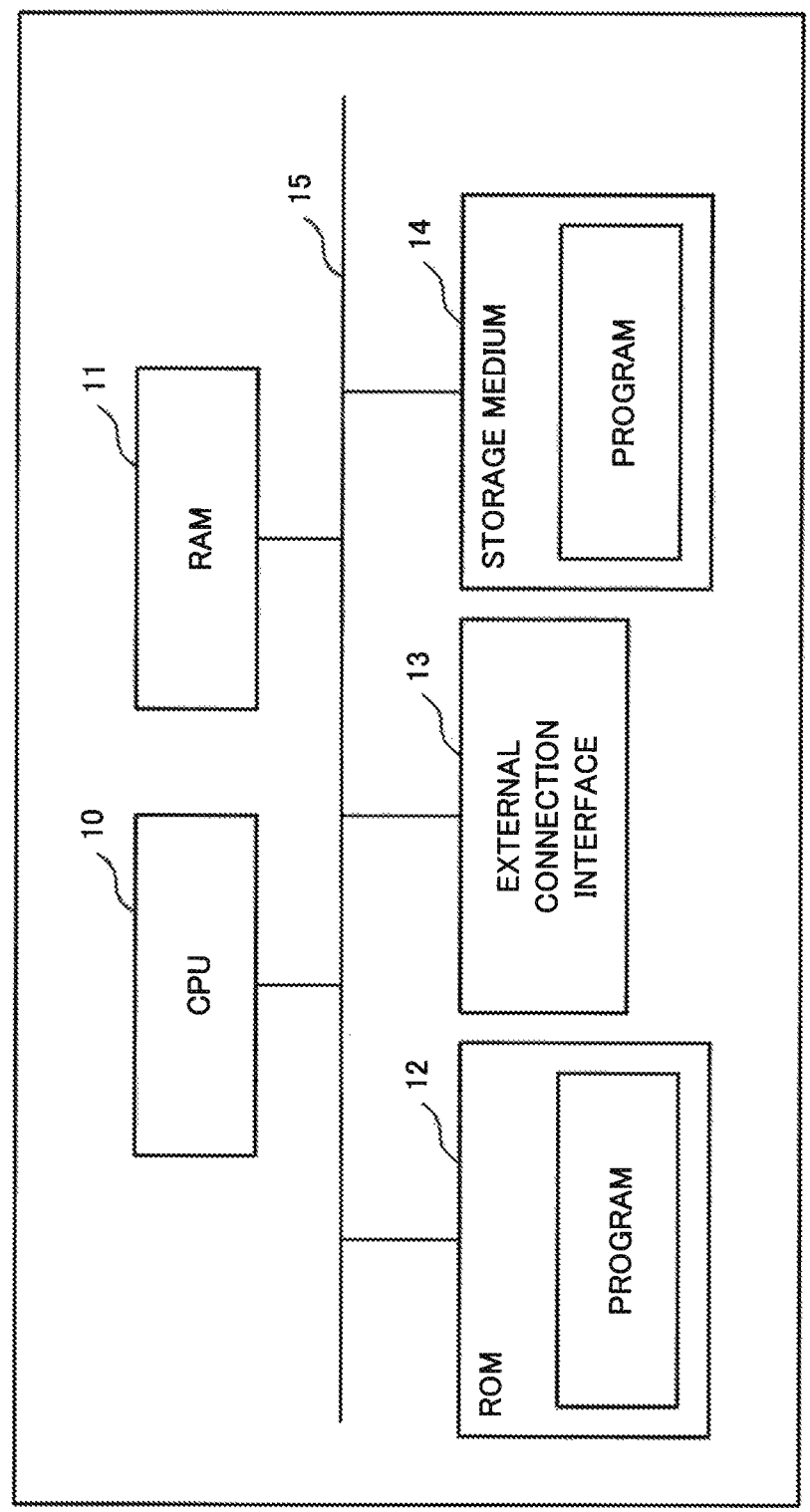
FIG. 11 is a diagram exemplifying a hardware configuration of an information processing device according to each of the example embodiments of the present invention.

Note that each of the units of the MAC tag list generating apparatus, the MAC tag list verifying apparatus and the MAC tag list updating apparatus illustrated in FIG. 1 and the like is implemented by a hardware resource exemplified in FIG. 11. In other words, a configuration illustrated in FIG. 11 includes a CPU 10, a Random Access Memory (RAM) 11, a Read Only Memory (ROM) 12, an external connection interface 13 and a storage medium 14 which are connected to one another through an internal bus 15. The CPU 10 controls an overall operation of each of the above apparatuses by reading out various software programs (computer programs) stored in the ROM 12 or the storage medium 14 to the RAM 11 and executing the software programs. In other words, in each of the above example embodiments, the CPU 10 executes software programs for executing the functions (units) of the above apparatuses while referring to the ROM 12 or the storage medium 14 as appropriate.

In addition, in each of the above-described example embodiments, as an example in which the functions indicated in the blocks of each of the apparatuses illustrated in FIG. 1 and the like are executed by the CPU 10 illustrated in FIG. 11, a case in which the functions are implemented by software programs. However, a part or all of the functions indicated in the blocks illustrated in FIG. 1 and the like may be implemented as hardware.

In addition, the present invention that has been described using each of the example embodiments as an example is accomplished by supplying computer programs capable of implementing the above-described functions to each of the above apparatuses, and thereafter reading out the computer programs to the RAM 11 and executing the computer programs by the CPU 10.

In addition, the supplied computer programs may be stored in a readable/writable memory (transitory storage medium) or a computer-readable storage device such as a hard disk device. Then, in such a case, the present invention can be regarded as being configured by codes representing the computer programs or a storage medium storing the computer programs.

In the above, the present invention has been described with reference to the example embodiments. However, the present invention is not limited to the above example embodiments. Various modifications that can be understood by those skilled in the art can be made to the configurations and details of the present invention within the scope of the present invention.

This application is based upon and claims the benefit of priority from Japanese Patent Application No. 2014-216361, filed on Oct. 23, 2014, the disclosure of which is incorporated herein in its entirety.

INDUSTRIAL APPLICABILITY

The present invention can be applied for detecting falsification and identifying a falsified position in, for example, wireless or wired data communication, a database, a file system, virus scanning, or a version management system, and other applications.

REFERENCE SIGNS LIST

10 CPU
11 RAM
12 ROM
13 External connection interface
14 Storage medium
100, 400 MAC tag list generating apparatus
101, 201, 301 Message input unit
102, 410 Group test matrix generating unit
103, 202 Block slice parallel MAC applying unit
104, 303 MAC tag list output unit
200 MAC tag list verifying apparatus
201 Message input unit
204 Verification result output unit
300 MAC tag list updating apparatus
302 Block slice parallel MAC updating unit
420 MAC tag list generating unit

The invention claimed is:

1. A Message Authentication Code (MAC) tag list generating apparatus comprising:
   a memory storing instructions; and
   one or more processors configured to execute the instructions to:
   acquire a message M that is composed of m individual items M[1], . . . M[m] and a MAC tag list T;
   generate, based on the m individual items composing the message M, an s-by-m group test matrix W for falsified position identification in accordance with a number of MAC tests s;
   generate, based on the s-by-m group test matrix W for falsified identification, a MAC tag list T* composed of s MAC tags for the message M composed of m items by adding results of applying, for each row of the generated s-by-m group test matrix, a pseudorandom function to the items forming the row while sharing the results, and applying a result of the addition to a pseudorandom permutation; and
   determine, by comparing the acquired MAC tag list T with the generated MAC tag list T*, existence of falsification of the message M, and, if any falsification is found, identify a falsified position corresponding to one of the m individual items.

2. The MAC tag list generating apparatus according to claim 1,
   wherein the one or more processors are further configured to execute the instructions to:
   in the generation of the MAC tag list T*:
   input, for all indices i of columns where "1" appears in j-th row of the group test matrix W, an item at i-th column of the row and the index i to a pseudorandom function,
   input exclusive OR of obtained results to a the pseudorandom permutation, and
   generate an obtained result as a MAC tag (T[j]) relating to items forming j-th row.

3. The MAC tag list generating apparatus according to claim 2, wherein the one or more processors are further configured to execute the instructions to:
   generate a MAC tag T[j] relating to items forming j-th row for j=1, . . . , s-th rows as a MAC tag list (T[1], . . . , T[s]).

4. A Message Authentication Code (MAC) tag list generating method comprising:
   acquiring a message M that is composed of m individual items M[1], . . . M[m] and a MAC tag list T;
   generating, based on the m individual items composing the message M, an s-by-m group test matrix W for falsified position identification in accordance with a number of MAC tests s;
   generating, based on the s-by-m group test matrix W for falsified identification, a MAC tag list T* composed of s MAC tags for the message M composed of m items by adding results of applying, for each row of the generated s-by-m group test matrix, a pseudorandom function to the items forming the row while sharing the results, and applying a result of the addition to a pseudorandom permutation; and
   determining, by comparing the acquired MAC tag list T with the generated MAC tag list T*, existence of falsification of the message M, and, if any falsification is found, identify a falsified position corresponding to one of the m individual items.

5. A non-transitory computer readable recording medium that records a Message Authentication Code (MAC) tag list generating program causing a computer to execute processing of:
   acquiring a message M that is composed of m individual items M[1], . . . M[m] and a MAC tag list T;

generating, based on the m individual items composing the message M, an s-by-m group test matrix W for falsified position identification in accordance with a number of MAC tests s;

generating, based on the s-by-m group test matrix W for falsified identification, a MAC tag list T* composed of s MAC tags for the message M composed of m items by adding results of applying, for each row of the generated s-by-m group test matrix, a pseudorandom function to the items forming the row while sharing the results, and applying a result of the addition to a pseudorandom permutation; and determining, by comparing the acquired MAC tag list T with the generated MAC tag list T*, existence of falsification of the message M, and, if any falsification is found, identify a falsified position corresponding to one of the m individual items.

6. The MAC tag list generating apparatus according to claim 1, wherein the one or more processors are further configured to execute the instructions to:

calculate an exclusive OR of the results of applying a pseudorandom function to, of the m individual items, the m individual items forming a row of the group test matrix W while sharing results, apply a result of the calculation to a pseudorandom permutation, generate the MAC tag list T' that is a list of MAC tags relating to the message M, compare the acquired MAC tag list T with the generated MAC tag list T*, and determine an existence of a falsification for each of the m items included in the message M.

* * * * *

UNITED STATES PATENT AND TRADEMARK OFFICE
CERTIFICATE OF CORRECTION

PATENT NO. : 10,355,862 B2
APPLICATION NO. : 15/521097
DATED : July 16, 2019
INVENTOR(S) : Kazuhiko Minematsu Page 1 of 1

It is certified that error appears in the above-identified patent and that said Letters Patent is hereby corrected as shown below:

In the Specification

Column 1, Cross Reference to Related Applications, Line 10; After "This", insert --is--

In the Claims

Column 16, Line 22; In Claim 2, after "claim 1,", delete "¶"

Column 16, Line 30; In Claim 2, after "a", delete "the"

Signed and Sealed this
Twenty-ninth Day of October, 2019

Andrei Iancu
*Director of the United States Patent and Trademark Office*